Figure 1:
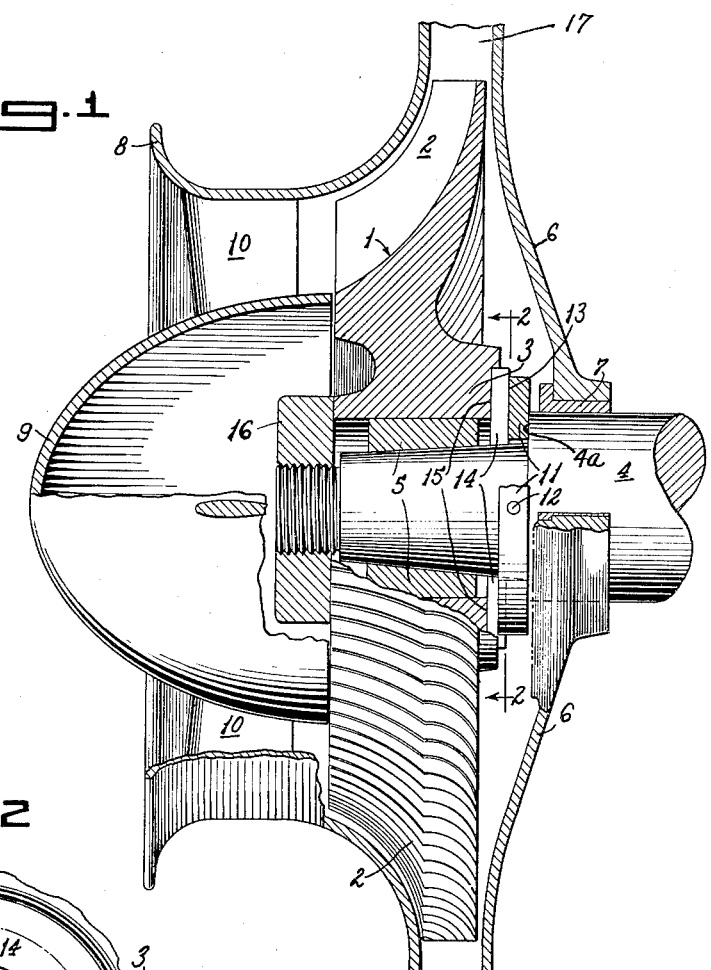

Jan. 30, 1962  T. W. CLAVELL  3,019,039
MEANS FOR MOUNTING A BODY ON A ROTATING SHAFT
Filed April 9, 1956

INVENTOR.
Thomas W. Clavell
BY
Campbell, Brumbaugh, Free
& Graves
his attorneys.

United States Patent Office 3,019,039
Patented Jan. 30, 1962

3,019,039
MEANS FOR MOUNTING A BODY ON A ROTATING SHAFT
Thomas W. Clavell, Hempstead, N.Y., assignor to Fairchild Stratos Corporation, a corporation of Maryland
Filed Apr. 9, 1956, Ser. No. 577,081
11 Claims. (Cl. 287—53)

This invention relates to a method and means for mounting a body, such as a compressor impeller, on a rotatable shaft so as to insure concentricity of the body on the shaft even at high speeds of rotation of the shaft and when exposed to a wide range of operating temperatures.

The problem of mounting a large, heavy body on a shaft which is rotatable at high speeds is complicated by the expansion of the body and the shaft caused by the effect of centrifugal force and/or any increase in temperature to which the body and shaft may be subjected during operation. This problem is further complicated by the fact that the body and the shaft may be made of different materials having different coefficients of thermal expansion, so that the shaft and the body will expand at different rates.

For example, in a compressor, it is not uncommon to mount an aluminum impeller on a steel shaft. The aluminum impeller, having a higher coefficient of thermal expansion, experiences a greater rate of expansion for a given temperature increase than the steel shaft. The effect of centrifugal force at high speeds of rotation of the shaft also contributes to the tendency toward increased clearance between the body and the shaft. Needless to say, any clearance that is permitted to develop between the body and the shaft is objectionable for the reason that it may permit damaging vibration to develop.

In instances where it is desired to shrink fit an aluminum impeller on a steel shaft and maintain a tight fit under all conditions of operation, it is necessary to provide an initial shrink of the impeller greater than the combined thermal and centrifugal differential expansions that may occur in operation. With a large impeller, the minimum shrink fit required may stress the impeller beyond the yield point of the material, so that shrink fitting the impeller directly on the shaft is not always feasible.

The primary object of the present invention is to provide a method and means of assembling a large, heavy body on a shaft to be rotated at high speed and subjected to a wide range of operating temperatures, notwithstanding the fact that the materials of the body and the shaft are different and characterized by different coefficients of thermal expansion. Another object of the invention is to avoid excessive stress in a body mounted on a shaft by shrink fitting, while nevertheless providing adequate shrink to allow for potential thermal and centrifugal expansion. A still further object of the invention is to provide a positive drive from the shaft to the body, while avoiding the use of stress-raising slots or keyways formed in the outer periphery of the shaft and in the inner periphery of the bore of the body.

In accordance with the present invention, a sleeve or bushing is interposed between the outer periphery of the shaft and the inner periphery of the bore of the body to be mounted on the shaft. In assembly, the sleeve is first shrunk fit around the outer periphery of the shaft, and then the body, in turn, is shrunk fit around the outer periphery of the sleeve. The material of the sleeve is selected so that the difference between the coefficients of expansion of the sleeve and the body is less than the difference between the coefficients of expansion of the shaft and the body. Thus, in the case of an aluminum impeller which is to be mounted on a steel shaft, the aluminum having a higher coefficient of thermal expansion than the steel, the sleeve would also be made of a material having a higher coefficient of thermal expansion than the material of the shaft, for example aluminum. The sleeve, however, is also selected to have a higher yield strength than that of the material of the body mounted on the shaft, thereby permitting the sleeve to be more tightly shrunk on the shaft than it might be feasible to shrink the body on the shaft.

Thus, in operation, the differential expansion between the sleeve and the body will be less than the differential expansion between the body and the shaft were the body shrunk fit directly onto the shaft. On the other hand, because of the higher yield strength of the material of the sleeve, the sleeve can be shrunk fit onto the shaft under higher stress to compensate for the potential differential expansion between the shaft and sleeve.

A further feature of the invention is in the means whereby registration is maintained between the body and the shaft to prevent slippage therebetween. According to this feature of the invention, a disk or washer is pinned directly to the shaft, and one of the faces of the disk or washer and a companion surface of the body are slotted to receive a key, which key serves as a mechanical coupling between the shaft and the body.

Figure 2:
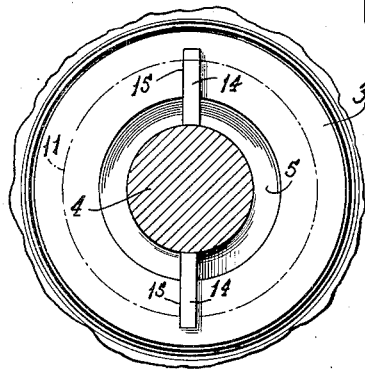

For a more complete understanding of the present invention, reference may be had to the detailed description which follows and to the accompanying drawing in which:

FIGURE 1 is a cross-section view of a compressor impeller mounted on a rotating shaft in accordance with the present invention; and FIGURE 2 is a cross-section view taken along the line 2—2 of FIGURE 1 looking in the direction of the arrows.

Referring to FIGURE 1 of the drawing, a compressor impeller 1 having a plurality of blades 2 formed thereon is supported on the forward end of a shaft 4 within the inlet compressor housing 8 and forward of the compressor casing 6. The compressor casing 6 accommodates a bearing 7 for the rotating shaft 4. The end of the rotating shaft 4 forward of the shoulder 4a tapers gradually toward the end to prevent axial movement of the impeller thereon. The hub 3 of the impeller is supported on this forward extension of the shaft 4, and a sleeve or bushing 5 is interposed between the outer periphery of the shaft and the inner periphery of the bore of the hub 3.

A shroud 9 is centrally supported within the compressor inlet housing 8 by means of radially disposed airfoil struts 10, and the shroud 9 is positioned forward of the shaft and hub portion of the impeller. The shroud 9, therefore, directs the flow of fluid toward the blades 2 of the impeller, which imparts rotation thereto, and thereafter the fluid is discharged through the outlet passage 17.

The sleeve 5, as will be more fully explained below, is shrunk fit around the outer periphery of the shaft, and the impeller, in turn, is shrunk fit around the outer periphery of the sleeve. Thus, by means of the shrink fitting of the sleeve on the shaft and the impeller on the sleeve, the impeller is coupled to and fixedly mounted on the shaft. The impeller, however, is also mechanically coupled directly to the shaft by means which includes a disk or washer 11 mounted on the shaft in abutting relationship with the shoulder portion 4a thereof, a pin 12 which passes through the disk 11 and the shaft 4 connecting the disk to the shaft, and radially disposed keys 14 which are set into slots 13 formed in the face of the disk 11 and companion slots 15 formed in the rear face of the hub 3 of the impeller. If preferred, the keys 14 can be formed integrally on the front face of the disk 11 or on the rear face of the hub 3.

The extreme forward end of the shaft 4 is threaded to accommodate a nut 16 thereon. However, inasmuch as the impeller 1 and the sleeve 5 are shrunk fit onto the shaft 4, the nut 16 serves only as a safety tightening means.

During assembly of the foregoing parts, the disk 11 is set in place on the shaft with the rear face of the disk abutting against the shoulder 4a, and the insertion of the pin 12 through accommodating holes in the disk and in the shaft couples the disk to the shaft. The keys 14 are then inserted in the slots 13 formed in the front face of the disk. The sleeve 5, after being heated to the established shrinking temperature, is placed on the shaft 4 and allowed to cool, the sleeve during cooling forming a tight fit with the shaft. It may be noted that the axial location of the sleeve on the shaft is not critical; hence, close manufacturing tolerances need not be held on the tapered portion of the shaft. Thereafter, the impeller 1, having been heated to the established shrinking temperature, is set in place on the sleeve 5 with the slots 15 of the hub 3 in registration with the keys 14. Finally, the nut 16 is threadably coupled on the end of the shaft and tightened.

By way of illustration of a specific embodiment of the invention, the impeller 1 may be made of a cast aluminum alloy such as Alcoa 142, and the shaft 4 made of steel. As mentioned above, it is frequently unfeasible to shrink fit the impeller directly onto the shaft because of the high stress that it would be necessary to place the impeller under to allow for the potential combined thermal and centrifugal differential expansions of the shaft and the impeller. Accordingly, the present invention provides for the shrink fitting of a sleeve 5 directly on the shaft, and for the shrink fitting of the impeller, in turn, on the sleeve. To reduce the differential expansion between the impeller and the sleeve to a minimum, it is desirable that the difference between the coefficients of expansion of the materials of the sleeve and the impeller be less than the difference between the coefficients of expansion of the materials of the shaft and the impeller. Ideally, of course, it would be desirable that the coefficient of expansion of the material of the sleeve be substantially the same as or very close to that of the impeller.

Moreover, in order to permit adequate shrink fitting of the sleeve onto the shaft to allow for potential differential expansion between the shaft and the sleeve, it is desirable that the material of the sleeve have a very high yield strength, higher than the yield strength of the material of the impeller. In this way, it is possible to place the sleeve under much greater shrink stress than it would be possible to shrink stress the impeller. A suitable material for the sleeve having these necessary characteristics is a wrought aluminum alloy, such as Alcoa 24-S. It is, of course, understood that many other combinations of materials may be used, and that the materials specified are merely for purposes of illustration.

In one typical application of the invention, the necessary shrink fitting of the impeller, were the impeller to be shrunk fit directly onto the shaft, would have necessitated placing the material of the impeller under a stress of 15,300 p.s.i., which is higher than the yield point of the material which it was planned to use. Consequently, it would have been completely unfeasible to shrink fit the impeller directly onto the shaft. However, by employing the present invention, it was possible to couple the impeller to the shaft suitably under a stress of 8,900 p.s.i., which stress was well below the yield point of the material.

The invention has been shown and described in a single preferred form and by way of example only, and obviously many modifications and variations may be made therein without departing from the spirit of the invention. The invention, therefore, is not to be limited to any specified form or embodiment, except in so far as such limitations are set forth in the appended claims.

I claim:

1. An apparatus comprising a rotatable shaft, a sleeve shrunk fit on said shaft and a driven element to be carried by the shaft shrunk fit on the sleeve, the coefficients of expansion of the sleeve and the driven element being greater than the coefficient of expansion of the shaft, but the difference between the coefficients of expansion of the materials of the sleeve and the driven element being less than the difference between the coefficients of expansion of the materials of the shaft and the driven element, and the material of the sleeve having a higher yield strength than the material of the driven element the sleeve being under greater shrink stress than the driven element.

2. An apparatus comprising a rotatable shaft, a sleeve shrunk fit on the shaft and a driven element shrunk fit on the sleeve, the sleeve being under greater shrink stress than the driven element, the material of the sleeve having a higher yield strength than the material of the driven element, the coefficients of expansion of the sleeve and the driven element being greater than the coefficient of expansion of the shaft, and the difference in the coefficients of thermal expansion of the materials of the sleeve and the driven element being less than the difference in the coefficients of thermal expansion of the materials of the driven element and the shaft.

3. In a rotary compressor, a shaft, a sleeve shrunk fit on the shaft, the material of the sleeve having a higher coefficient of thermal expansion than the material of said shaft, and a driven element shrunk fit on the sleeve, the sleeve being under greater shrink stress than the driven element and the difference between the coefficients of expansion of the materials of the sleeve and the driven element being less than the difference between the coefficients of expansion of the materials of the shaft and the driven element.

4. In a machine for rotary motion, a drive shaft, a sleeve shrunk fit on said shaft, and a driven element shrunk fit on the sleeve, the coefficients of expansion of the sleeve and the driven element being greater than the coefficient of expansion of the shaft, the difference between the coefficients of thermal expansion of the materials of the sleeve and the driven element being less than the difference between the coefficients of thermal expansion of the shaft and the driven element, and the sleeve being under greater shrink stress than the driven element.

5. A machine as set forth in claim 4 wherein the portion of the shaft on which the sleeve is shrunk fit is tapered.

6. In a machine for rotary motion, a drive shaft, a sleeve shrunk fit on said shaft, a driven element shrunk fit on the sleeve, the sleeve being under greater shrink stress than the driven element, the coefficients of expansion of the sleeve and the driven element being greater than the coefficient of expansion of the shaft, the difference between the coefficients of thermal expansion of the materials of the sleeve and the driven element being less than the difference between the coefficients of thermal expansion of the shaft and the driven element, and the material of the sleeve having a higher yield strength than the material of the driven element, and a mechanical coupling between the shaft and the driven element to prevent slippage therebetween.

7. A machine as set forth in claim 6 wherein the mechanical coupling comprises a member mounted on and attached to the shaft, and a key and slot connection between the member and the driven element.

8. In a rotary compressor, a steel drive shaft, an aluminum sleeve shrunk fit on the shaft, and an aluminum impeller shrunk fit on the sleeve, the sleeve being under greater shrink stress than the impeller, the difference between the coefficients of expansion of the materials of the sleeve and the impeller being less than the difference between the coefficients of expansion of the materials of the shaft and the impeller, and the material of the sleeve having a higher yield strength than the material of the impeller to permit it to be shrunk fit at a stress higher than the yield point of the material of the impeller.

9. Means for mounting a driven element on a rotatable shaft in which the material of the driven element has a higher coefficient of expansion than the material of the shaft comprising a sleeve-shrunk fit on the shaft, the coefficient of expansion of the material of the sleeve being higher than that of the material of the shaft and the coefficient of expansion of the driven element being at least as great as that of the material of the sleeve, the sleeve being under greater shrink stress than the driven element.

10. In a rotary compressor, a shaft, a sleeve-shrunk fit on the shaft, the material of the sleeve having a higher coefficient of thermal expansion than the material of the shaft, and an impeller shrunk-fit on the sleeve, the coefficient of expansion of the material of the impeller being higher than that of the material of the shaft and at least as great as that of the material of the sleeve, the material of the sleeve having a higher yield strength than the material of the impeller, and the shrink stress in the sleeve being greater than the shrink stress in the impeller.

11. A method of mounting a driven element on a rotatable shaft, the coefficient of expansion of the driven element being higher than the coefficient of expansion of the shaft, comprising the steps of shrink-fitting a sleeve on the shaft, the material of the sleeve having a higher coefficient of expansion than the material of the shaft and the material of the driven element having a coefficient of expansion at least as great as the material of the sleeve, and shrink-fitting the driven element onto the sleeve with less shrink stress than that with which the sleeve is shrunk-fit on the shaft.

References Cited in the file of this patent
UNITED STATES PATENTS

| | | |
|---|---|---|
| 1,746,187 | Breakell et al. | Feb. 4, 1930 |
| 2,318,051 | Brace | May 4, 1943 |
| 2,442,254 | Whitfield | May 25, 1948 |
| 2,443,688 | McFarland | June 22, 1948 |
| 2,516,472 | MacKeage | July 25, 1950 |
| 2,590,761 | Edgar | Mar. 25, 1952 |